United States Patent
Akridge

(10) Patent No.: US 6,280,804 B1
(45) Date of Patent: Aug. 28, 2001

(54) NOVELTY WINDMILL

(76) Inventor: Allen P. Akridge, 647 NE. 23rd St., Gainesville, FL (US) 32641

( * ) Notice: Subject to any disclaimer, the term of this patent is extended or adjusted under 35 U.S.C. 154(b) by 0 days.

(21) Appl. No.: 09/353,831

(22) Filed: Jul. 15, 1999

Related U.S. Application Data

(60) Provisional application No. 60/101,733, filed on Sep. 24, 1998.

(51) Int. Cl.⁷ .................................................. B60R 13/00
(52) U.S. Cl. .......................................... 428/31; 428/542.2
(58) Field of Search .................................. 428/13, 15, 7, 428/31, 33, 542.2; 446/213, 217

(56) References Cited

U.S. PATENT DOCUMENTS

| | | |
|---|---|---|
| D. 61,185 | 7/1922 | Gill . |
| D. 71,002 | 9/1926 | Bocchino et al. . |
| D. 73,056 | 12/1927 | Scott . |
| D. 83,759 | 3/1931 | Scott . |
| D. 89,473 | 3/1933 | Whelan . |
| 154,014 | 8/1874 | Brierly . |
| D. 224,549 | 8/1972 | Kroll . |
| D. 332,665 | 1/1993 | Garrison . |
| D. 335,509 | 5/1993 | Friend . |
| 717,295 | 12/1902 | Soulee . |
| 1,159,253 | 11/1915 | Nash . |
| 1,273,416 | 7/1918 | Selm . |
| 1,360,970 | 11/1920 | Morgan . |
| 1,442,290 | 1/1923 | Pallone . |
| 1,502,599 | 7/1924 | Timmons . |
| 1,538,562 | 5/1925 | Koshalko . |
| 1,570,332 | 1/1926 | Brown . |
| 1,628,331 | 5/1927 | Pence et al. . |
| 1,693,057 | 11/1928 | Scott . |
| 1,773,617 | 8/1930 | Fonda . |
| 1,894,105 | 1/1933 | Kupfer . |
| 1,953,272 | 4/1934 | Smith . |
| 2,035,531 | 3/1936 | Butcher . |
| 3,119,197 | 1/1964 | Adams . |
| 3,638,355 | 2/1972 | Stnecklin . |
| 4,019,828 | 4/1977 | Bunzer . |
| 4,758,197 | 7/1988 | Lee . |
| 5,014,641 | 5/1991 | Johnson . |
| 5,042,418 | 8/1991 | Hoover et al. . |
| 5,232,391 | 8/1993 | Vaughns et al. . |

Primary Examiner—Blaine Copenheaver
Assistant Examiner—Abraham Bahta
(74) Attorney, Agent, or Firm—Patent & Trademark Services; Joseph H. McGlynn

(57) ABSTRACT

A novelty windmill which includes a propeller, a drive shaft which is driven by the propeller, a motion transmitter for transmitting motion to a display item, and a display item which is moved by the motion transmitter. The novelty item is placed on a vehicle, so that the windmill and display item move as the vehicle is driven. The novelty windmill preferably includes a brake mechanism which controls the speed of the windmill. The brake mechanism may be in the form of a friction member which causes frictional force on the drive shaft when an air brake lever is rotated or otherwise moved due to the force of moving air on a brake paddle member. The display item can be a movable mascot or insignia for a sports team. The windmill may be placed on a moving vehicle.

8 Claims, 3 Drawing Sheets

NOVELTY WINDMILL

This is a conversion of Provisional application Ser. No. 60/101,733, filed Sep. 24, 1998.

BACKGROUND OF THE INVENTION

The present invention relates in general to windmills, and in particular to windmills which may be attached to vehicles in order to impart mechanical movement to a display item.

1. Field of the Invention

While the invention is subject to a wide range of applications, it is especially suitable for use on an apparatus where the display item is, for example, a mascot or insignia of a sport team, and will be particularly described in that context. The invention also relates to a method of supporting a team, entity, or organization by placing a windmill or similar wind driven device with a movable representation of a team mascot or team insignia on a vehicle and driving the vehicle so to impart movement to the team mascot or team insignia.

2. Description of the Prior Art

The general use of stationary windmills to impart mechanical movements is known. For example, U.S. Pat. No. 1,693,057 to Scoft; U.S. Design Patent No. 73,056 to Scoft; and U.S. Pat. No. 154,014 to Briedy all show windmills which use the force of wind to turn a propeller which imparts rotary force to a crank thus imparting reciprocating movement to the display item.

In such windmills, significant forces can be imparted on the display item if the wind becomes powerful. In such a scenario, the display item may be reciprocated at a very high speed, thus subjecting the display item and any linkages there between to large amounts of force and shock. This can lead to accelerated wear and tear on the apparatus, or to immediate breakage and failure.

SUMMARY OF THE INVENTION

The present invention is directed toward a novelty windmill apparatus which may be attached to a vehicle, such as a car, truck, or bus, and used to display support for a sports team or organization. The apparatus includes a movable display item that is driven by the windmill as the vehicle is driven. The apparatus preferably includes a brake mechanism designed to control the speed of movement of the movable display item, particularly when the vehicle is moving at high speeds. This arrangement substantially obviates one or more of the limitations and disadvantages of the described prior art.

One object is to provide a novel system and method to display support for a sports team, or organization, or other entity or person such as a political candidate.

Another object is to provide a windmill novelty device that can safely and effectively be placed on a vehicle and operated with acceptable ranges of rotation and movement, regardless of the speed at which the vehicle is driven.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects in accordance with the purpose of the invention, as embodied and broadly described herein, the invention comprises a novelty windmill which includes a propeller, drive shaft which is driven by the propeller, a motion transmitter for transmitting motion to a display item, and a display item which is moved by the motion transmitter. The novelty windmill further includes a mechanical system for temporarily or permanently fixing the windmill to a vehicle.

In a preferred embodiment, the novelty windmill includes a brake mechanism which controls the speed of the windmill. The brake mechanism preferably will develop a force to offset the tendency of the windmill and display item to move more quickly, as the vehicle speed increases. The brake mechanism thereby keeps the speed of movement of the display item within a fairly close range throughout its use. The brake mechanism may be in the form of a friction member which causes frictional force on the drive shaft when an air brake lever is rotated or otherwise moved toward the drive shaft in response to the force of moving air on a brake paddle member.

The brake mechanism is designed to permit the windmill to rotate but prevents the windmill from moving too quickly, which can result in breakage and deterioration of the novelty windmill. This will allow the windmill to be placed in environments where the air speed striking the propeller can be very high, for example, on a moving vehicle driven at a high rate of speed.

The invention also includes a method of supporting a sports team or organization by placing the organization's name or mascot or insignia, or another identifying design or group of symbols or words, on a movable display item of a novelty windmill. The method can also be used to advertise a particular product or service. The method includes the steps of placing the identifying design or logo on a windmill device designed to impart movement to the identifying design or logo, placing the movable windmill on a vehicle, driving the vehicle, and controlling the degree of rotation of the windmill and the movement of the design or logo through a brake mechanism on the vehicle.

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts. For the sake of description, the frontal direction is to the right, in the direction of travel of the vehicle in FIG. 1, and the rearward direction is to the left, in the opposite direction of travel of the vehicle in FIG. 1.

Figure 1:
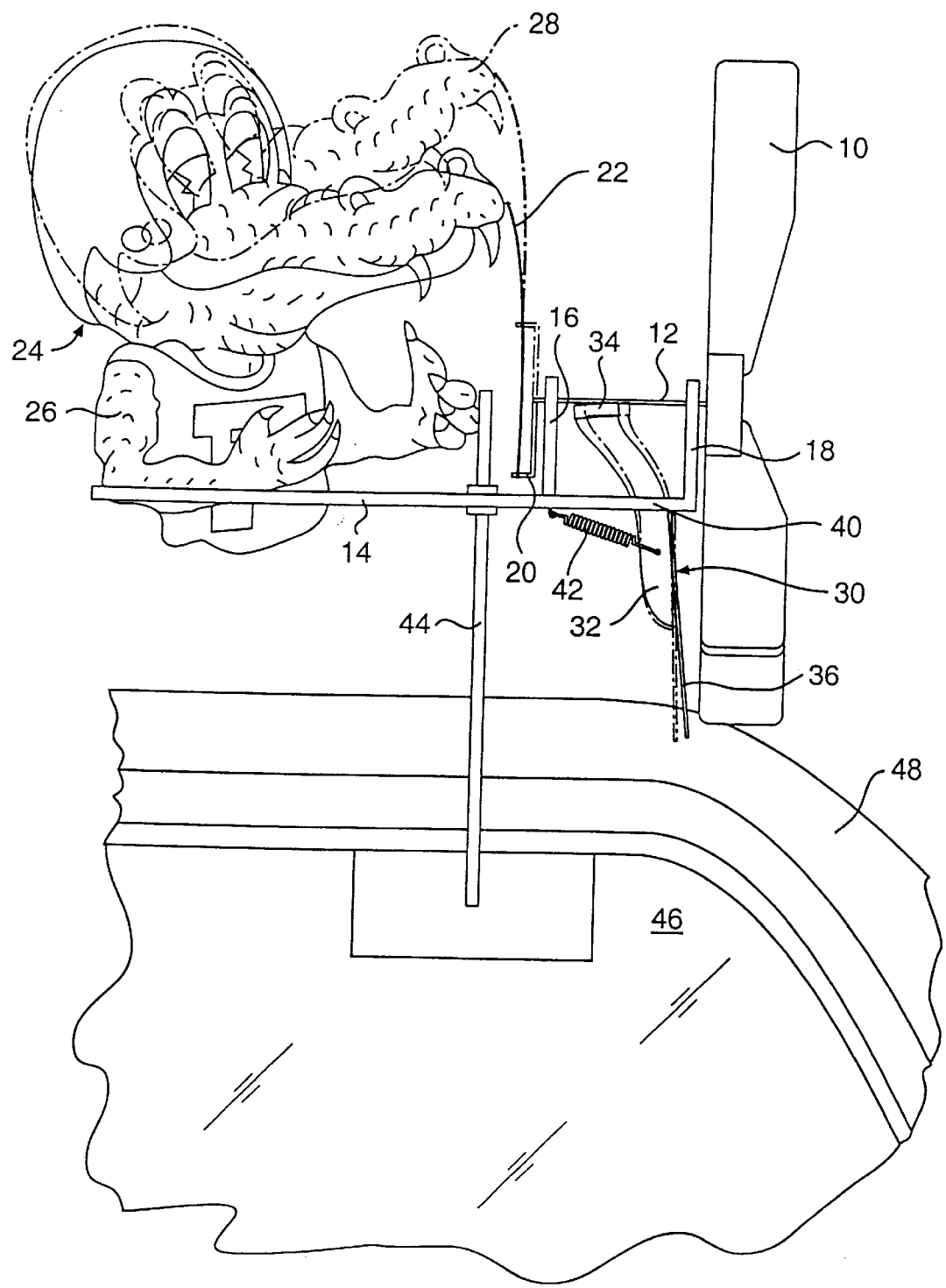
FIG. 1 is a side view of the novelty windmill according to the first embodiment of the invention.

FIG. 1 shows one embodiment of the present invention. This embodiment of the present invention is a novelty windmill which may be attached to the top of a moving vehicle. The novelty windmill includes a display item which in this case is a movable representation of a Florida Gator mascot. The display item 24 is driven by a propeller 10 which imparts rotary motion to a drive shaft 12. Drive shaft 12 is supported by first vertical support 16 and second vertical support 18. Drive shaft 12 is connected to a crank 20 by any conventional attachment means, or it could be made unitary with the crank 20. The crank imparts motion to a linkage mechanism 22. Linkage mechanism 22 can be of a variety of sizes and shapes. In the embodiment shown, the linkage mechanism is a stiff metal wire. One end of the linkage mechanism 22 is connected to the movable portion 28 of the display item, by any conventional means, and the other end is connected, by any conventional means, to the crank 20.

In the embodiment of FIG. 1, the display item 24 is made up of a stationary portion 26 and a movable portion 28, by any conventional means. Alternatively, the movable portion of the display item may be directly pivoted on the horizontal support 14 or any other portion of the support. The movable portion of the display item can be designed so that it reciprocates, oscillates, or follows any number of different motions available through conventional mechanical linkages or gears.

The display item can be of a large variety of designs. In FIG. 1, the display item is in the design of a mascot for a sport team. The display item can be used in a wide number of ways ranging from advertising for a business to simply an entertaining or funny display.

In the first embodiment shown in FIG. 1, the linkage imparts a reciprocating motion to the movable portion 28 of the display item as the crank 20 is turned by the propeller 10 and the shaft 12. The crank 20 is shown in solid lines in a downward vertical position. When the crank is in the downward position, the linkage mechanism 22 and the movable display portion 28 are also in their respective downward positions. When the crank rotates 180 degrees to the position shown in dashed lines, the linkage mechanism 22 moves upwards, causing the movable display portion to also move upwards, rotating in the counterclockwise direction. These motions repeat while the drive shaft continues to rotate.

The novelty windmill may be connected to a moving vehicle by a variety of different methods, including adhesives, magnets, fasteners, etc. In the embodiment shown, the windmill is attached to a window 46 of vehicle 48 via the attachment support 44. The support 44 has a generally U-shaped or V-shaped bracket that fits over the top of the window and is held in place when the window is moved into its top or up position.

Figure 3:
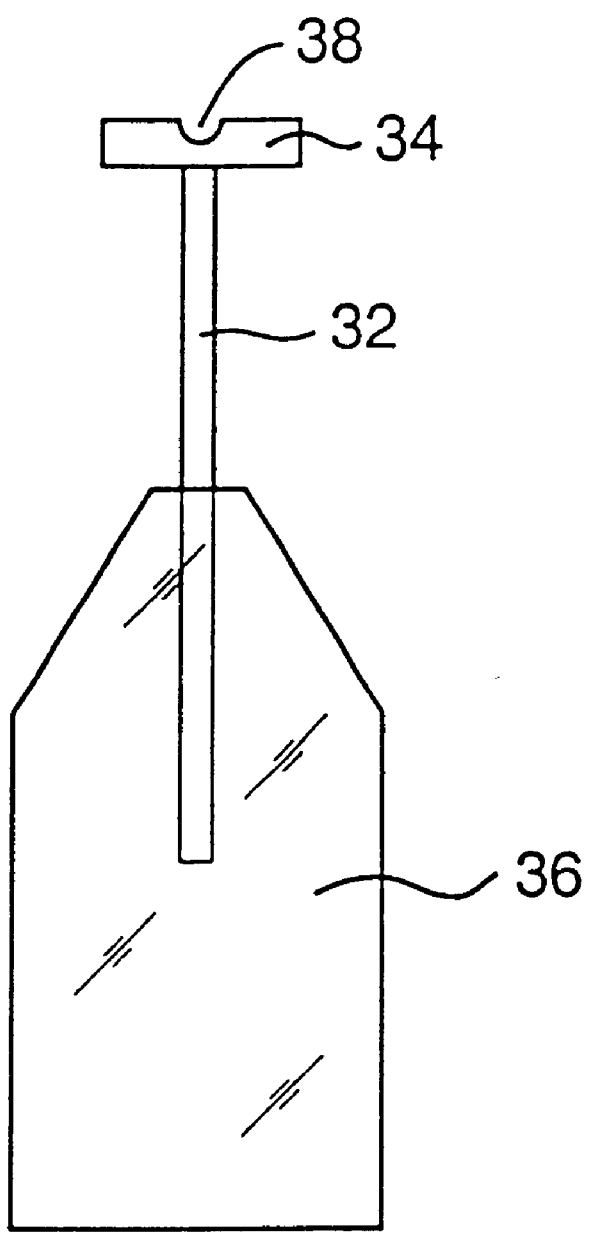
FIG. 3 is a frontal view of portions of one embodiment of the brake mechanism.

The novelty windmill includes air brake mechanism 30. The air brake mechanism controls the speed of rotation of the windmill. The air brake mechanism prevents the propeller 10, drive shaft 12, crank 20, linkage 22, and movable display portion 28 from moving too quickly, which can result in breakage of the novelty windmill. A front view of portions of the brake mechanisms is shown in FIG. 3. The air brake mechanism is made up of brake paddle member 36, air brake lever 32, friction member 34, and spring 42 (see also FIG. 1). Brake paddle member 36 has a broad surface that faces toward the front of vehicle, when the windmill is attached, and is in a shape and size selected to provide the desired amount of aerodynamic resistance to properly control the specific windmill, linkage, and the movable design. Generally, the specific size and structure of the airbrake mechanism can be designed through testing and experimentation.

In the embodiments shown, the paddle member 36 is in the shape of a paddle. The brake paddle could be circular, rectangular or any other appropriate shape. Brake paddle member 36 is attached to the front surface of air brake lever 32, by any conventional means. Air brake lever 32 pivots about the horizontal support member 14 at pivot point 40, shown in FIG. 1, and can be attached to the member 14 in any conventional way, such as, but not limited to, a pivot pin (not shown) which passes through apertures in member 32 and member 14.

Air brake lever 32 has a friction member 34 which frictionally engages the drive shaft 12 via the frictional surface 38. In the embodiment shown in FIG. 3, the frictional surface is semi-circular. However, it can be a variety of sizes and shapes. The frictional surface 38 is lightly urged against the driving shaft by a spring 42 which biases the air brake lever in the clockwise direction (as viewed from FIG. 1). The amount of spring force only needs to be large enough to prevent the air brake lever from rotating in the counterclockwise direction when the vehicle is at rest or moving slowly. The biasing spring prevents vibrations on the brake lever arm. In addition, the biasing spring prevents the paddle member from interfering with the propeller if the air brake lever were to rotate counterclockwise. Alternatively, the air brake lever can be designed so that it interferes with a physical stop, for example, vertical support 16, to prevent the paddle member from interfering with the propeller.

The operation of the brake mechanism 30 is as follows. When the vehicle is at rest, the brake lever 32 and brake paddle member 36 are in the position shown in solid lines in FIG. 1. In the initial rest position, the brake lever is lightly biased in the clockwise direction by spring 32, thus creating a very small amount of friction between friction surface 38 and the drive shaft 12. This amount of friction is minimal and will not prevent the drive shaft and propeller from rotating. However, when the vehicle is driven at increased speeds, the amount of resistance by the air paddle 36 increases, causing the brake lever to rotate clockwise about pivot point 40, thereby increasing the frictional force on drive shaft 12. The increased frictional force on drive shaft 12 will help to control the speed of the propeller and movable display portion 28. The amount of resistance developed by the brake mechanism will increase as the speed of the vehicle increases, thereby keeping the speed of rotation of the windmill and the movement of the display item within a close range. Because the frictional force increases as a function of the vehicle speed, the propeller will not rotate too quickly. This will prevent possible breakage and wear and tear on the apparatus.

Figure 2:
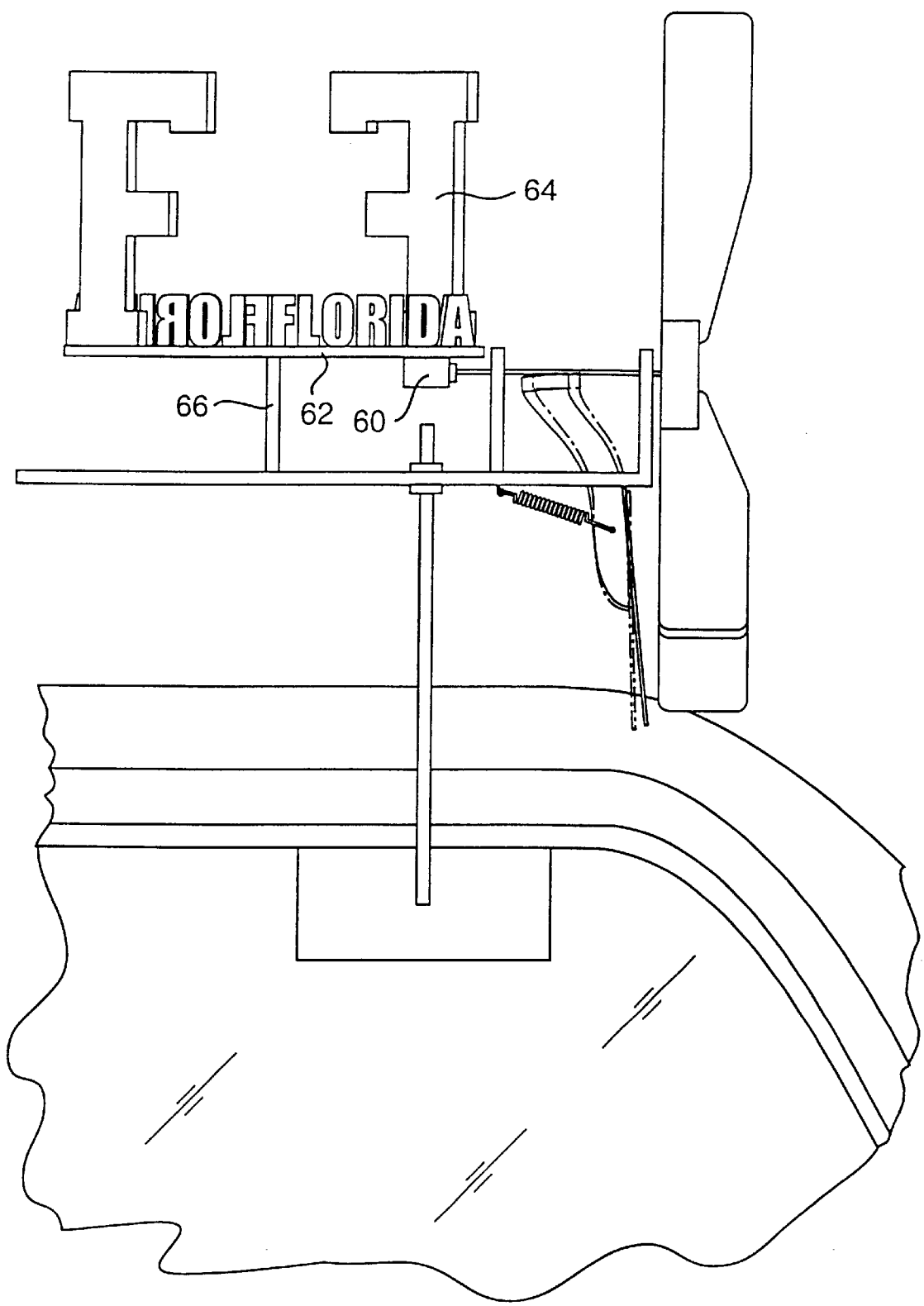
FIG. 2 is a side view of the novelty windmill according to an alternative embodiment of the invention.

The embodiment of FIG. 2 is an example of a different type of display item which may be used with the invention. In FIG. 2, the majority of the invention is identical to that of FIG. 1. Only the portions which are different will be described. In the embodiment of FIG. 2, the drive shaft has a roller 60 attached at the end thereof. The roller is frictionally engaged with a carousel platform 62 on which display item 64 is placed. The display item 64 and carousel platform 62 rotate about or with center support 66. In the embodiment shown in FIG. 2, the display item comprises the name or logo of a sport team. This embodiment would be particularly useful in the case of a school without a mascot, or for advertising purposes. As the propeller rotates the drive shaft, the drive shaft rotates roller 60 which it turn rotates platform 62.

The windmill may be used in a variety of different environments. The windmill may be placed on any type of moving vehicle, for example, an automobile, truck, motorcycle, boat, bicycle, jetski, etc. Alternately, the windmill may also be placed on any stationary object so that the propeller is blown by the wind.

It will be apparent to those skilled in the art that various modifications and variations can be made in the design of the present invention and in construction of this novelty windmill without departing from the scope or spirit of the invention. Other embodiments of the invention will be apparent to those skilled in the art from consideration of the specification and practice of the invention disclosed herein. It is intended that the specification and examples be considered as exemplary only claims.

What I claim as my invention is:

1. A novelty item adapted to be attached to a vehicle comprising:

platform means for supporting said novelty item, means for attaching said platform means to a vehicle, said novelty item comprising at least one movable part, means attached to said at least one movable part for imparting motion to said at least one movable part, and means for controlling the speed of said at least one movable part, and wherein said means attached to said at least one movable part for imparting motion to said at least one movable part comprises:

a propeller, a shaft connected to said propeller, a crank connected to said shaft, and means connecting said shaft to said at least one movable part, and wherein said means for controlling the speed of said at least one movable part comprises:

a first element mounted behind said propeller, a lever connecting said first element to a brake element, said brake element being in contact with said shaft.

2. The novelty item as claimed in claim 1, wherein said means connecting said shaft to said at least one movable part is a piece of stiff wire.

3. The novelty item as claimed in claim 1, wherein said crank has a first portion which is disposed perpendicular to said shaft, and a second portion which is parallel to said shaft.

4. The novelty item as claimed in claim 3, wherein said means connecting said shaft to said at least one movable part is connected to said second portion of said crank.

5. The novelty item as claimed in claim 1, wherein a spring means is mounted between said lever and said platform means for holding said brake element in contact with said shaft.

6. The novelty item as claimed in claim 1, wherein said at least one movable part moves in an up and down motion.

7. The novelty item as claimed in claim 1, wherein said at least one movable part moves in a circular motion.

8. The novelty item as claimed in claim 7, wherein said means attached to said at least one movable part for imparting motion to said at least one movable part comprises:

a propeller, a shaft connected to said propeller, a roller connected to said shaft, and said roller engaging and rotating said platform means.

* * * * *